United States Patent
Pivnik

[11] Patent Number: 5,950,359
[45] Date of Patent: Sep. 14, 1999

[54] TREE STAKING SYSTEM

[76] Inventor: Ross Pivnik, 9205 S. W. 130th St., Miami, Fla. 33176

[21] Appl. No.: 09/046,930

[22] Filed: Mar. 23, 1998

[51] Int. Cl.$^6$ ...................................................... A01G 5/00
[52] U.S. Cl. ...................................................... 47/43; 47/42
[58] Field of Search .................................... 47/20, 21, 23, 47/24, 42, 43, 44; 248/545, 530, 156, 230.8, 351, 346.03, 346.01

[56] References Cited

U.S. PATENT DOCUMENTS

| | | | |
|---|---|---|---|
| 527,492 | 10/1894 | Hihn | 248/351 |
| 543,298 | 7/1895 | Douglas | 248/351 |
| 1,021,650 | 3/1912 | Worthington | 248/351 |
| 1,844,024 | 2/1932 | Weber | 248/231 |
| 2,170,822 | 8/1939 | Kirkpatrick | 47/24 |
| 2,296,217 | 9/1942 | Maloney | 248/351 |
| 2,501,255 | 3/1950 | Bell | 248/44 |
| 3,526,056 | 9/1970 | Stropkay | 47/42 |
| 4,341,039 | 7/1982 | Reese | 47/2 |
| 4,520,590 | 6/1985 | Schuh | 47/43 |
| 4,562,662 | 1/1986 | Ten Pas | 47/43 |
| 4,699,347 | 10/1987 | Kuhnley | 248/516 |
| 4,894,950 | 1/1990 | Yukio et al. | 47/42 |
| 5,117,779 | 6/1992 | Karow | 119/69.5 |
| 5,129,179 | 7/1992 | Kronmiller | 47/42 |
| 5,159,780 | 11/1992 | Molthen | 47/70 |
| 5,310,151 | 5/1994 | Engel | 248/231 |
| 5,402,600 | 4/1995 | Tompkins | 47/42 |
| 5,492,302 | 2/1996 | Odom, Jr. | 248/524 |

FOREIGN PATENT DOCUMENTS

| | | | |
|---|---|---|---|
| 366305 | 5/1906 | France | 47/43 R |
| 672935 | 3/1939 | Germany | 47/23 |
| 814677 | 7/1949 | Germany | 47/42 R |
| 2407496 | 11/1974 | Germany | 47/43 R |
| 3715632 | 10/1987 | Germany | 47/23 |
| 405095736 | 4/1993 | Japan | 47/44 |
| 406181642 | 7/1994 | Japan | 47/42 |

*Primary Examiner*—Michael J. Carone
*Assistant Examiner*—Fredrick T. French, III
*Attorney, Agent, or Firm*—Malloy & Malloy, P.A.

[57] ABSTRACT

A staking assembly designed to support a tree in a substantially upright position and being specifically structured to allow operative installation or mounting of the assembly about a tree trunk by a single worker wherein the assembly comprises a plurality of support members movably positionable at spaced apart locations from one another about the circumference of a tree trunk along a length of an attachment assembly, and further including a plurality of brace members at least equal in number to the number of support members wherein each brace member includes a distal end engaging the ground substantially adjacent the tree trunk and a proximal end disposed in abutting, force exerting engagement with an outer surface of one of the plurality of support members so as to exert a supportive, bracing force on the tree trunk. A protective pad or like structure is formed on the inner surface of each support member and disposable in confronting engagement with the exterior surface of the tree trunk so as to eliminate or reduce the possibility of scaring or blemishing the tree trunk surface.

20 Claims, 2 Drawing Sheets

TREE STAKING SYSTEM

BACKGROUND OF THE INVENTION

1. Field of the Invention

This invention relates to a staking assembly for supporting a tree in a substantially upright or predetermined position such as when the tree is being replanted or during periods when the tree requires additional support due to inclement weather.

2. Description of the Related Art

The practice of providing supplementary support or bracing to trees, such as when replanting such trees, is common and is generally accomplished using what is known as a "tree staking system". Such known systems, while assumed to be technically operative for accomplishing the required bracing or support to maintain a tree in an upright position, include certain disadvantages which render utilization of such known staking systems cumbersome, relatively expensive, and which frequently results in damage to the tree being supported.

More specifically, the prior art staking systems generally comprise the wrapping of a circumference of a tree trunk segment with some type of protective material such as burlap cloth or the like in an attempt to protect the tree. A plurality of trunk engaging members, generally in the form of wooden blocks are then positioned in spaced relation to one another about the wrapped segment of the tree trunk and in overlying relation to the protective covering surrounding the trunk segment. One or more metal bands are then positioned to surround all of the aforementioned trunk engaging members through frictional engagement or fixed attachment to an outer surface thereof. The metal bands are thereby forced into in confronting engagement with each of the trunk engaging members so as to substantially fix there positions relative to the tree trunk. A supportive force is applied to the tree at the points of engagement of the trunk engaging members by the application of an elongated board or like structure which, in accordance with prior art techniques, is fixedly attached such as by nailing the correspondingly positioned end of the bracing boards directly to the trunk engaging blocks. Other types of fixed engagement of the corresponding ends of the bracing members are also utilized.

It should be readily apparent that while the above described prior art systems may be considered to be at least minimally operative for their intended purpose, they are fraught with numerous problems. Such problems arising through the use of such prior art systems, especially when the tree trunk is not adequately wrapped, includes the tendency of the blocks to become disengaged from the protective wrap member and accordingly scar or otherwise mark the bark or exterior surface of the tree. Furthermore, the actual burlap or other covering used to "protect" the tree often results in a great degree of damage to the tree. Specifically, the heavy burlap coverings used to protect the tree surface from the wooden blocks tends to suffocate the tree and/or cause the accumulation of moisture and mildew at the bark surface, such that when removed an eroded or blemished region is present on the outer surface of the tree trunk. Yet another significant disadvantage associated with these prior art techniques is the man-hour expense involved in their proper application and installation. In particular, in order to adequately mount such prior art staking systems, a plurality of workers are required, as well as the utilization of tools such as a hammer or nails, and other tools for fixedly attaching the mounting bands to the truck engaging members and also for fixedly attaching the corresponding ends of the bracing boards to the trunk engaging members as set forth above. For example, one or more individuals are required to hold all of the blocks in their spaced orientation around the tree trunk, while another individual wraps the metal bands around the blocks and fastens them to one another. Moreover, because of the angle at which the supports are disposed, a large number of nails must typically be employed to prevent the boards from merely sliding down the surface of the wooden blocks when secured. It is, of course, readily apparent that the more personnel utilized to apply or install each prior art system, the greater cost factor of their installation and use, especially when each individual could install a complete system of the present invention in the time it takes three individuals to install one prior art system.

Accordingly, there is a need in this area for a specifically designed and configured, preferred tree staking system, which eliminates the possibility of blemishing or marring the exterior surface of the tree trunk. In addition, such a preferred system should be designed to include structural components which allow the mounting or application of the preferred system by a worker without the required use of a large amount of tools and equipment. Also, a preferred tree staking system should have the advantage requiring only a single worker for installation thereof so as to maximize the number of systems which can be installed in a given time period. In addition, the various components should be readily adjustable so as to be adaptable to trees of various sizes and shapes, and can preferably be re-useable because of the uniform and convenient way in which it is mounted. This would allow the preferred tree staking system to be used for large trees having relatively shallow root bases or young trees of smaller size requiring adequate support or bracing when they are replanted.

SUMMARY OF THE INVENTION

The present invention is directed towards a tree staking system designed to support or provide supplementary bracing to a tree so as to maintain it in a substantially upright or other predetermined position when the tree is replanted. Such supplemental bracing is normally required during the replanting process and is usually continued until the roots of the tree take firm hold. More specifically, the subject tree staking assembly comprises at least one but preferably a plurality of support members having a generally elongated configuration and comprising an outer surface and an inner surface. An attachment assembly is used to removably but securely position the support members in spaced relation to one another about the circumference of a trunk of the tree being supported.

In the preferred embodiment, to be described in greater detail hereinafter, the attachment assembly comprises at least one but preferably two spaced apart, substantially parallel straps. The straps are preferably formed of a high strength flexible plastic material. Moreover, the straps are cooperatively structured with the support members to allow the support members to move along the length of the straps in order to be adjustably positioned at the appropriate locations relative to the tree trunk being supported.

The two, spaced apart straps are structured to be disposed in surrounding relation to the tree trunk and are cooperatively structured with the support members so as to pass through spaced apart, elongated, transversely oriented channels. The channels extend through each of the support members and include open ends to allow sliding movement of the support members along the length of the straps. Further, each of the straps defining the aforementioned attachment assembly includes connector members formed substantially at one end thereof and structured so as to receive an opposite end of the straps therethrough.

Accordingly, each of the straps, once having the plurality of support members movably mounted thereon, is easily and loosely fitted in surrounding relation to a predetermined segment of the tree trunk by a single individual, such that frictional engagement between the support members and the tree is achieved, but so that the support members can be slid about the tree to the desired spot. Once the support members are positioned as desired, the connector members of each strap may be further "tightened" making the circumference of each of the straps smaller. This in turn forces a fixed positioning of each of the support members in their predetermined positions about the tree trunk.

Another feature of the present invention is the provision of a protective portion on the inner surfaces of each of the support members. This protective portion is preferably in the form of a soft, substantially porous material pad covering substantially the entire inner surface of each of the support members so as to engage the exterior surface of the tree trunk being supported. These protective pads are specifically structured to prevent any type of scarring or blemishing of the exterior surface of the tree at the points of engagement of the support members even though a significant bracing force is applied to the tree trunk. Further, the provision of these protective pads eliminates the need for any type of wrapping of the circumference of the tree trunk, as with known systems, thereby allowing exposure of the majority of the exterior surface portions of the tree trunk to air, water, etc. Again blemishing or marring of the exterior surface of a tree by elimination of the protective wrapping material is thereby eliminated.

In order to apply the proper bracing force to the tree trunk, preferably at spaced apart locations about the circumference of the tree trunk, a brace assembly is provided in the form of at least one brace member cooperatively engaging each of the support members. More specifically, each of the brace members comprises an elongated rigid material member having a proximal end disposed in force transferring engagement with the outer surface of each support member. The opposite distal end of each bracing member engages or is at least partially buried in the ground substantially adjacent or surrounding the tree being supported. Preferably, the outer surface of each of the support members is specifically structured and cooperatively configured so as to receive and at least partially retain the proximal end of at least one of the brace members. Therefore, each of the outer surfaces includes at least one but preferably a pair of spaced apart surface indentations cooperatively configured with that of the distal end of the brace member engaging each of the support members. The provision of such surface indentations is such that it may eliminate the need for any types of tools such as a hammer and nail to fixedly secure the proximal end to the outer surface of the support members which confrontingly engages the tree trunk. In particular, the brace members can essentially be wedged between the support members and the ground. The existence of two such surface indentations allows different positioning of one brace member in order that proper support or bracing force can be exerted on the trunk of the tree. Alternately, two brace members may be positioned to concurrently engage the outer surface of one support member if additional support or bracing force is required.

Therefore, it is a primary object of the present invention to provide a staking system designed to support a tree in a predetermined, upright position and which is capable of being installed or mounted in a bracing position by a single worker.

Another primary object of the present invention is to provide a staking system which can be installed and removed from its operative, supporting position relative to a tree by a single person without the need for conventional or specialized tools.

Yet another important object of the present invention is to provide a staking system which applies and maintains adequate bracing or supporting forces to the trunk portion of a tree about a circumference thereof without causing substantial blemishing or scarring of the tree trunk at the points of application of such supportive forces.

Still another important object of the present invention is to provide a staking system for a tree wherein the operative, structural components thereof are removably disposed in predetermined operative positions without being fixedly attached to one another.

It is also an important object of the present invention to provide a staking system incorporating a plurality of trunk engaging support members which are easily and efficiently positionable at predetermined locations about the circumference of a tree trunk segment without the need for more than one worker.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying Figures, the present invention relates to a staking system generally indicated as 10 and including at least one but preferably a plurality of support members having somewhat of an elongated configuration and including an outer surface 14 and an inner surface 16. In use, at least one of the support members 12 are disposed in confronting engagement with the exterior surface of a tree trunk as at 18 in FIG. 4. It should be emphasized, of course, that a plurality of the support members 12 are normally used in applying force at various spaced apart locations to the tree trunk 18 so as to maintain it in a preferred, upright or otherwise predetermined position. Commonly, three or more of such support members 12 are utilized so that a bracing force may be applied to the tree trunk at equally spaced distances about the circumference thereof.

Figure 1:
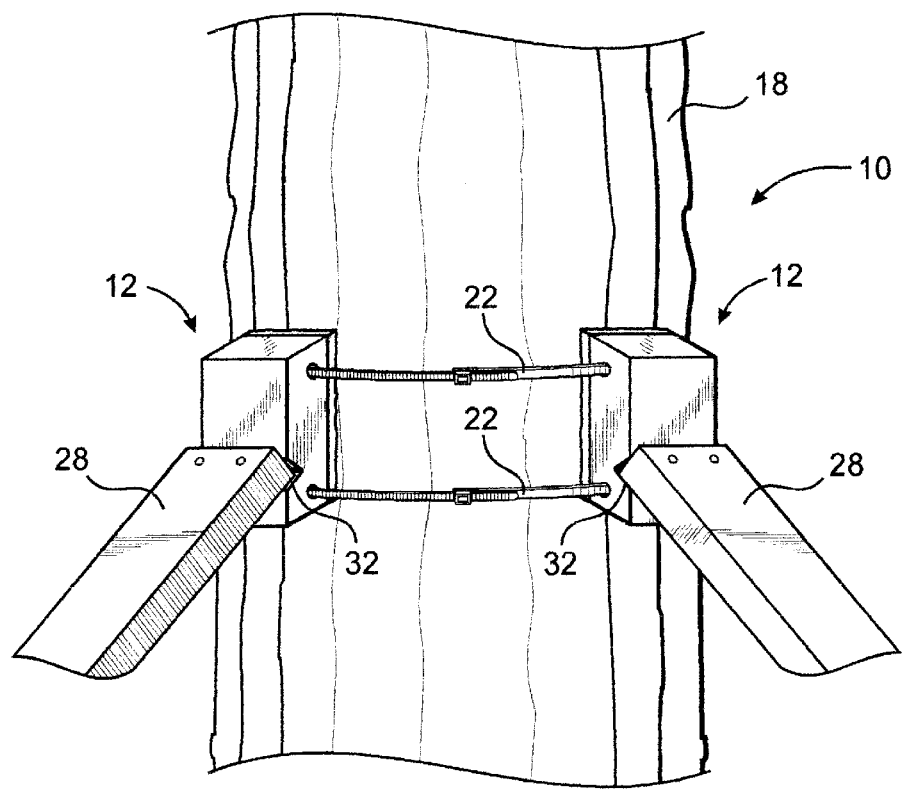
FIG. 1 is a perspective view of the staking assembly of the present invention in its operative position about a trunk of tree being supportive.
Figures 2, 3:
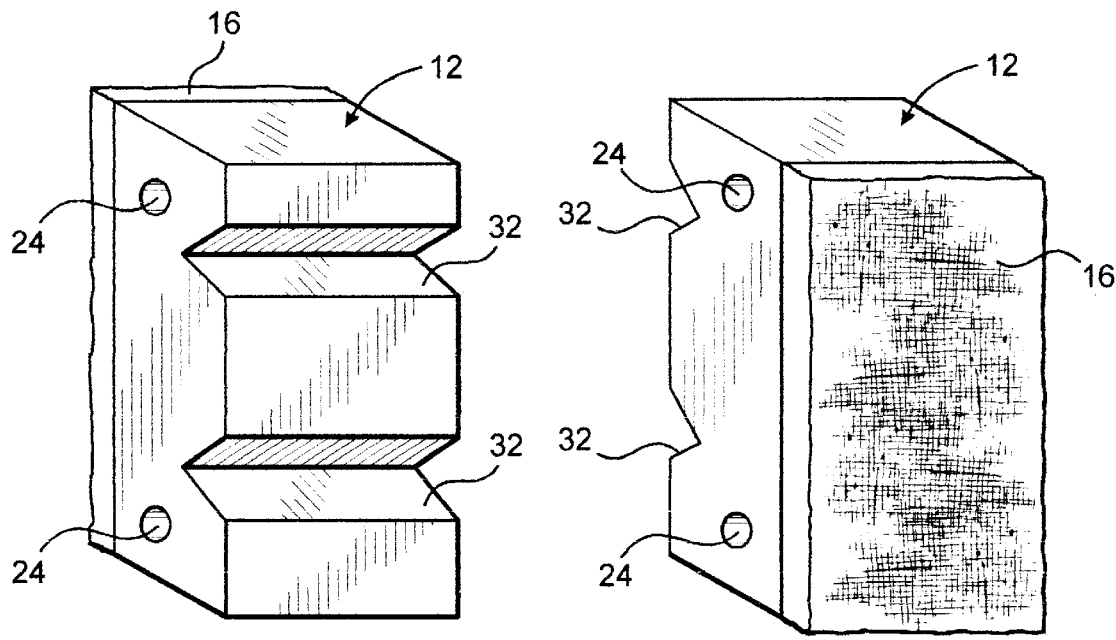
FIG. 2 is a front perspective view of one component of the assembly of the embodiment of FIG. 1.
FIG. 3 is a rear perspective view of the structure of FIG. 2.

An attachment assembly 20 comprising at least one but preferably a pair of elongated straps as at 22 which are preferably movably coupled to each of the support members 12. Each of the straps 22 are intended to be disposed in surrounding, closed loop relation to the segment of the tree trunk 18 being supported as best shown in FIG. 1. Furthermore, the support members 12 may be disposed at fixed locations along a length of the strap 22, with adjustment of the strap's position about the tree adjusting the position of the support member 12, or they can be structured to slide or otherwise be moved along a length of the strap 22. The preferred sliding movement of the support members 12 along the length of each of the straps 22 is facilitated by passage of the straps 22 through open ended channels 24 formed substantially adjacent to but spaced from the opposite ends of the support members 12. Each of the channel 24 are specifically dimensioned and configured so as to allow sliding movement of the support members along the length of the attachment straps 22. This sliding movement facilitates a single person positioning the support members about the tree trunk at predetermined locations after merely reaching around and securing the straps 22 about the trunk of the tree.

Another important feature of the present invention is the provision of a protective portion on the inner surface 16 of each of the support members 12. Such protective portion is in the form of a soft, preferably porous material pad, such as from felt, which is disposed so as to confrontingly engage the exterior surface 18' of the tree at locations where each of the support members 12 are operatively positioned. The protective pads 16 are structured to prevent or eliminate scaring or blemishing of the exterior surface 18' even though a significant bracing or supportive force is transferred to the tree trunk 18 at the locations of the support members 12.

Figure 4:
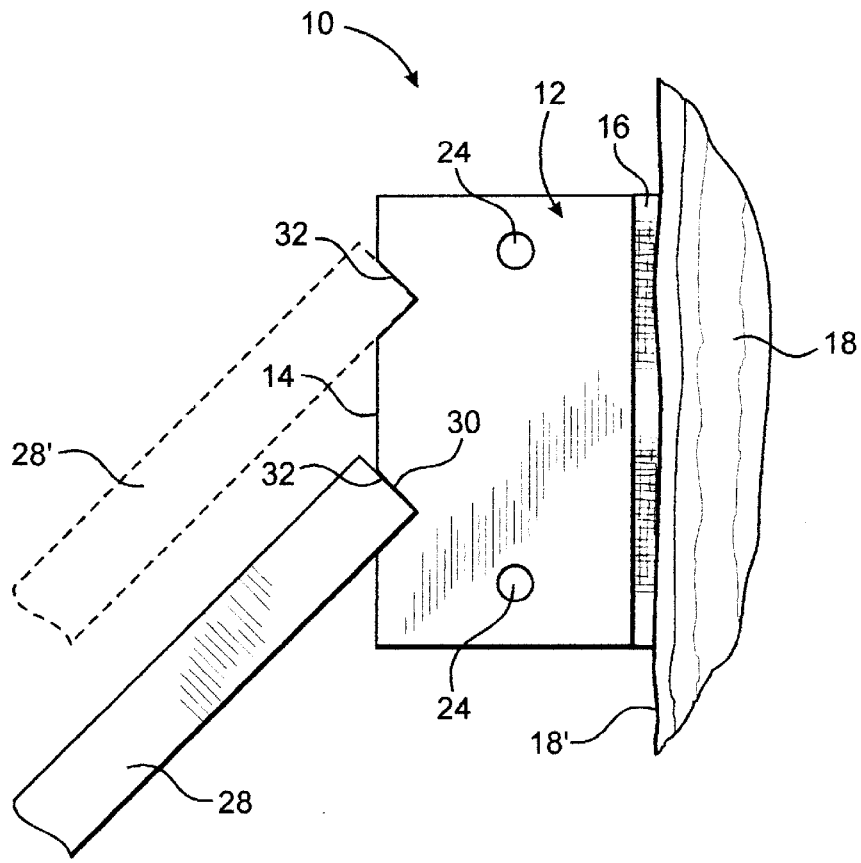
FIG. 4 is a side view in partial phantom and cutaway showing one operative position of structural components of the assembly of FIG. 1.
Figure 5:
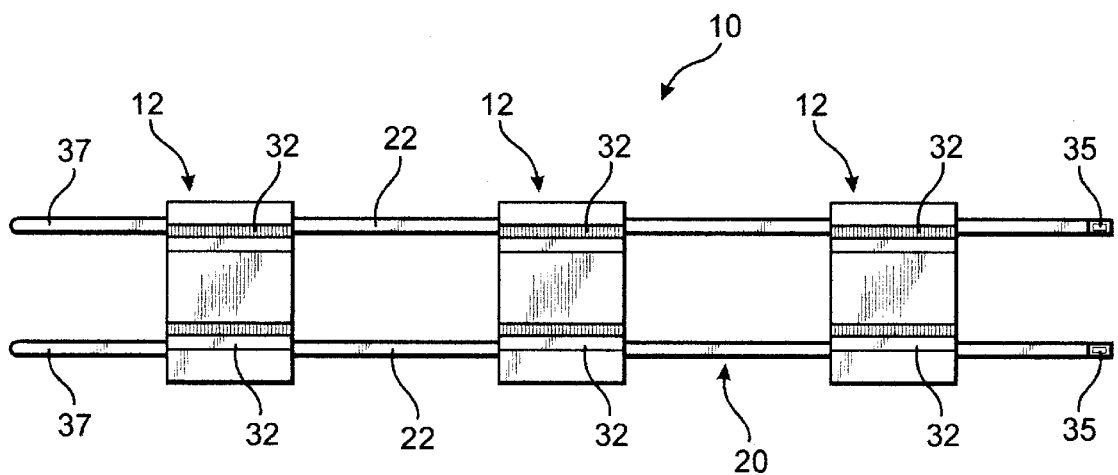
FIG. 5 is a front plan view of the embodiment of FIG. 1 in its unassembled form.

A brace assembly in the form of at least one elongated, rigid material brace member 28 is further provided to engage each of the support members 12. With reference to FIGS. 1 and 4, each of the brace members 28 has a proximal end as at 30 disposed to engage and be at least partially retained by the outer surface 14 of each of the support members 12. The outer surface 14 of each of the support members 12 is preferably structured to include at least one but preferably two spaced apart surface indentations 32. Each of the surface indentation is cooperatively structured and configured with the proximal end 30 of each of the brace members 28 such that the proximal end 30 will be received and at least partially retained in abutting engagement with the outer surface 14. A bracing or supportive force will thereby be transferred to the support members 12 and accordingly, to the tree trunk 18 in order to maintain it in the aforementioned upright or other predetermined position. The provision of two such surface indentations 32 allows for the positioning of a single brace member 28 at either point along the outer surface 14 of each of the support members 12. Alternately, two brace members 28 and 28' may abuttingly engage the outer surface as represented in both solid and phantom lines of FIG. 4. Each of the brace members are operatively positioned in an angular orientation such that the opposite or distal end of each of the brace members 28, 28' is preferably engaging or at least partially buried or disposed in penetrating relation to the ground surrounding the tree trunk 18. It should be apparent that this operative positioning provides the aforementioned supportive force to each of the support members 12 and accordingly to the tree trunk 18. Moreover, the surface indentation may take on a variety of configurations and may be recessed in the support member or defined by one or more articles or protrusions formed on or secured to the support member.

Another feature of the present invention is the provision of a connector member as at 35 located at one end of each of the straps 22. Each of these connector members cooperates with the opposite ends 37 of each strap 22 so as to allow passage of the end 37 through the connector member 35 and facilitate the tightening of each of the straps in a fixed position about the trunk 18 so as to fixedly but removably maintain the support members in their operative, force transferring position as best shown in FIGS. 1 and 4. The connector members 35 preferably cable ties, may be additionally structured so as to allow release of the ends 37 of the straps 22 as well as a portion of the length thereof engaged by the connector members 35, thereby permitting further adjustment and/or re-use thereof. Furthermore, the specific structure of the connector may be of any conventional type, such as those employed in wire bundle fasteners, clips, clamps, belt holes, cable ties, etc.

It should therefore be apparent that the assembly may be easily mounted in its operative position as shown in FIG. 1 by a single worker and just as easily and efficiently be removed therefrom once support or bracing of the tree 18 is no longer required. In particular, a single worker simply extends the straps 22, with the support members 12 bunched together in a manipulable orientation about the tree trunk 18, and secures the strap in place utilizing the connector members 35. Once secured, the support members 12 are slid about the tree trunk 18 until disposed in a desired position. Lastly, the brace members are wedged in place, and if desired are nailed or bolted to the support members 12. As such, only a minimal area of the tree trunk is covered, but even that area is protected by a soft protective surface.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A staking assembly designed to support and maintain a tree in a substantially upright position, said assembly comprising:

a) at least one support member positionable in supportive engagement with a trunk of the tree being supported, b) an attachment assembly movably coupled to said one support member in supporting relation thereto and structured for removable attachment to the tree trunk, c) said one support member and said attachment assembly cooperatively structured to selectively dispose said one support member in any one of a plurality of positions about the tree trunk, d) a brace assembly interconnected between said one support member and a ground portion substantially adjacent the tree and disposed and cooperatively structured with said one support member to exert a supportive, bracing force on the tree trunk, e) at least a second support member, and f) said brace assembly including a plurality of brace members, each brace member including an elongated configuration having a distal end engaging the ground and a proximal end disposed in abutting engagement with an outer surface of a different one of said first and second support members.

2. An assembly as in claim 1 wherein said one support member comprises a protective portion formed thereon and disposed in confronting engagement with an exterior surface of the tree trunk, said protective portion structured to minimize damage to the exterior surface of the tree trunk.

3. An assembly as in claim 2 wherein said protective portion is formed of a soft, porous material structured to allow at least minimal airflow to a surface portion of the tree engaged by said protective portion.

4. An assembly as in claim 2 wherein said protection portion comprises a felt pad.

5. An assembly as in claim 1 wherein said attachment assembly comprises an elongated configuration and is disposed in surrounding relation to the tree trunk, said one support member adjustably positionable along the length of said attachment assembly into any one of said plurality of positions about the tree trunk.

6. An assembly as in claim 5 wherein said attachment assembly comprises at least one elongate strap of sufficient length to surround the tree trunk and movably coupled in supporting relation to said one support member, said one support member selectively positionable along the length of said one strap into supportive engagement with the tree trunk.

7. An assembly as in claim 6 wherein said one support member comprises at least one channel formed therein and being dimensioned and configured to allow said strap to extend therethrough, said one support member slidable along the length of said strap.

8. An assembly as in claim 7 wherein said one strap further comprises a connector member formed thereon and disposed and structured to form said one strap into a substantially closed loop configuration and further structured to allow adjustment of the circumference thereof into a fixed position about the tree trunk.

9. An assembly as in claim 1 wherein said one support member comprises an outer surface portion configured to receive and at least partially retain said brace assembly thereon.

10. A staking assembly designed to support and maintain a tree in a substantially upright position, said assembly comprising:

a) at least one support member positionable in supportive engagement with a trunk of the tree being supported, b) an attachment assembly movably coupled to said one support member in supporting relation thereto and structured for removable attachment to the tree trunk, c) said one support member and said attachment assembly cooperatively structured to selectively dispose said one support member in any one of a plurality of positions about the tree trunk, d) a brace assembly interconnected between said one support member and a ground portion substantially adjacent the tree and disposed and cooperatively structured with said one support member to exert a supportive, bracing force on the tree trunk, e) said attachment assembly comprising at least two elongate straps each operatively disposable in surrounding relation to the tree trunk and movably coupled in supporting relation to said support member, said support member selectively positionable along the length of said two straps into supportive engagement with an exterior surface of the tree trunk, and f) said support member including two open ended channels extending therethrough and disposed in spaced relation to one another, each channel dimensioned and configured to have one of said straps movably pass therethrough such that said support member is concurrently movable along the length of said straps into any one of a plurality of supportive positions about a circumference of the tree trunk.

11. A staking assembly designed to support and maintain a tree in a substantially upright position, said assembly comprising:

a) an attachment assembly having an elongated configuration and disposable into a substantially closed looped configuration in surrounding relation to a trunk of the tree, b) at least two support members each movably mounted on said attachment assembly and independently positionable in spaced relation to one another along a length of said attachment assembly, c) each of said support members positionable into confronting engagement with the tree trunk at spaced apart locations about a circumference thereof, d) a brace assembly removably disposed in interconnected relation between each of said support members and a ground portion adjacent the tree trunk, e) said brace assembly disposed and cooperatively structured with each of said support members to exert a supportive, bracing force on the tree trunk at spaced apart locations, and f) said brace assembly comprising a plurality of brace members, each brace member including an elongated configuration having a distal end engaging the ground and a proximal end disposed in abutting engagement with an outer surface of a different one of said support members.

12. An assembly as in claim 11 wherein said outer surface of each of said support members is at least partially configured to receive and at least partially retain said proximal end of a different one of said brace member.

13. An assembly as in claim 12 wherein said outer surface of each of said support members includes two surface indentations formed therein in spaced relation to one another, each of said surface indentations dimensioned and configured to receive and at least partially retain said proximal end of one of said brace members therein.

14. An assembly as in claim 10 wherein each of said support members comprises a protective pad mounted on an inner surface thereof and disposable in engaging relation to an exterior surface of the tree trunk, said protective pad formed of a material structured to restrict damaging of the exterior surface at portions thereof engaged by said support members.

15. An assembly as in claim 10 wherein said attachment assembly comprises at least one elongate strap of sufficient length to surround the tree trunk and movably coupled in supporting relation to each of said support members, said support members selectively positionable along the length of said one strap into supportive engagement with the tree trunk in spaced relation to one another.

16. An assembly as in claim 15 wherein said attachment assembly comprises two elongate straps each operatively disposable in surrounding relation to the tree trunk and movably coupled in supporting relation to each of said support members, each of said support members selectively positionable concurrently along the length of said two straps into supportive engagement with an exterior surface of the tree trunk at spaced apart locations relative to one another.

17. An assembly as in claim 16 wherein each of said support members include two open ended channels extending therethrough and disposed in spaced relation to one another, each channel dimensioned and configured to have one of said straps movably pass therethrough such that each support member is concurrently movable along the length of said straps into any one of a plurality of supportive positions about a circumference of the tree trunk.

18. An assembly as in claim 17 wherein each support member includes said channels, and at least portions of said strap positioned therein being disposed in substantially parallel relation to one another.

19. A staking assembly designed to support and maintain a tree in an upright position, said assembly comprising:
   a) plurality of support members disposable in supporting engagement with a trunk of a tree in spaced relation to one another,
   b) an attachment assembly including at least two elongate straps operatively disposed in surrounding relation to the tree trunk and having each of said support members concurrently and movably mounted thereon for selective positioning along the length thereof into any one of a plurality of support positions about a circumference of the tree trunk,
   c) each of said support members including a substantially elongated configuration having a length thereof oriented along a length of the tree trunk and including an outer surface and an inner surface,
   d) each of said support members further including a protective portion formed on said inner surface thereof and positionable in confronting engagement with an exterior surface of the tree trunk, said protective portion structured to restrict damaging of the exterior surface at said support positions,
   e) a plurality of brace members each having an elongated configuration terminating at a distal end and a proximal end and angularly oriented in removable interconnecting positions between the plurality of support members and a ground portion adjacent the tree trunk, and
   f) each of said brace members being operatively disposed and cooperatively structured with one of said plurality of support members with which it is engaged, to exert a supporting, bracing force on the tree trunk at said plurality of support positions.

20. An assembly as in claim 19 wherein each of said support members include two surface indentations formed on said outer surface thereof in spaced relation to one another and substantially adjacent opposite ends thereof, each of said to surface indentations cooperatively configured with said distal ends of said brace members to receive and at least partially retain one of said brace members in force exerting engagement with said support member.

* * * * *